(12) United States Patent
Crews

(10) Patent No.: US 7,078,370 B2
(45) Date of Patent: Jul. 18, 2006

(54) BIODEGRADABLE CHELANT COMPOSITIONS FOR FRACTURING FLUID

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 359 days.

(21) Appl. No.: 10/238,072

(22) Filed: Sep. 9, 2002

(65) Prior Publication Data

US 2003/0119678 A1 Jun. 26, 2003

Related U.S. Application Data

(60) Provisional application No. 60/323,572, filed on Sep. 19, 2001.

(51) Int. Cl.
*C09K 8/00* (2006.01)
*E21B 43/26* (2006.01)

(52) U.S. Cl. ............. 507/209; 507/211; 507/219; 507/241; 507/271; 507/273; 507/921; 507/922; 507/903; 166/308.5

(58) Field of Classification Search .......... 507/209, 507/211, 219, 241, 271, 273, 922, 921, 903; 166/308.5
See application file for complete search history.

(56) References Cited

U.S. PATENT DOCUMENTS

| 3,981,363 A | 9/1976 | Gall |
| 4,465,619 A | 8/1984 | Boskamp |
| 4,470,915 A | 9/1984 | Conway |
| 4,900,475 A | 2/1990 | Ramachandran et al. |
| 4,917,186 A | 4/1990 | Mumallah |
| 5,116,513 A | 5/1992 | Koskan et al. |
| 5,152,902 A | 10/1992 | Koskan et al. |
| 5,217,632 A | 6/1993 | Sharif |
| 5,445,223 A * | 8/1995 | Nelson et al. ............ 166/308.5 |
| 5,523,023 A | 6/1996 | Kleinstuck et al. |
| 5,551,515 A | 9/1996 | Fodge et al. |
| 5,877,127 A | 3/1999 | Card et al. |
| 6,060,436 A | 5/2000 | Snyder et al. |
| 6,103,092 A | 8/2000 | Silva |
| 6,140,277 A | 10/2000 | Tibbles et al. |
| 6,207,079 B1 | 3/2001 | Kmec et al. |
| 6,617,285 B1 * | 9/2003 | Crews ........................ 507/201 |
| 2003/0092581 A1 * | 5/2003 | Crews ........................ 507/100 |
| 2003/0185767 A1 * | 10/2003 | Liley et al. ................... 424/49 |

(Continued)

FOREIGN PATENT DOCUMENTS

EP 0 528 461 A2 2/1993

(Continued)

OTHER PUBLICATIONS

"M-PYROL, (N-Methyl-2-Pyrrolidone)," Product Brochure, International Specialty Products, Oct. 1994.

(Continued)

*Primary Examiner*—Philip C. Tucker
(74) *Attorney, Agent, or Firm*—Madan, Mossman & Sriram P.C.

(57) ABSTRACT

It has been discovered that biodegradable and non-toxic chelant compositions can perform multiple beneficial functions in an aqueous fracturing fluid through the chelation of ions. Some of the multiple functions include various combinations of the following: demulsifier, demulsifier enhancer, scale inhibitor, crosslink delay agent, crosslinked gel stabilizer, enzyme breaker stabilizer, and the like. Some of the chelants used in the compositions include, but are not necessarily limited to, sodium polyaspartate; sodium iminodisuccinate; disodium hydroxyethyleneiminodiacetate ($Na_2HEIDA$); sodium gluconate; sodium glucoheptonate; sugar alcohols; monosaccharides; disaccharides; and mixtures thereof.

22 Claims, 4 Drawing Sheets

U.S. PATENT DOCUMENTS

2004/0019199 A1* 1/2004 Crews .................. 536/124
2004/0127367 A1* 7/2004 Crews .................. 507/100

FOREIGN PATENT DOCUMENTS

EP            0 805 260 A2    11/1997
GB            2393968 A    *   4/2004
WO         WO 95/33914 A1    12/1995

OTHER PUBLICATIONS

AG 6202 Surface Chemistry Product Brochure, Akzo Nobel, Jul. 29, 1997.

WPI/Derwent Abstract 475570/199744 of JP 9221654 A, 1997.

WPI/Derwent Abstract 090126/199908 of JP 10324746 A, 1999.

WPI/Derwent Abstract 511769/199943 of JP 11221596 A, 1999.

"PVP, Polyvinylpyrrolidone Polymers," Product Brochure, International Specialty Products, Jan. 1999.

"Surfadone LP, Specialty Surfactants," Product Brochure, International Specialty Products, Mar. 1999.

WPI/Derwent Abstract 128247/200012 of EP 974,613 A2, 2000.

"Versene Chelating Agents," Product Brochure, Dow Chemical Company, 2001 [cited Aug. 10, 2001]: Available from: http://www.dow.com/versene/index.htm.

Versene EDG Chelating Agent (XUS 40855.00), Product Brochure, Dow Chemical Company, 2001 [cited Aug. 13, 2002]: Available from: http://www.dow.com/versene/pro/biodegra/edg.htm.

"Iminodisuccinate, Iminiodisuccinic Acid Sodium Salt," Product Brochure, Bayer Corporation [cited Aug. 13, 2002]: Available from: http://www.pasp-ids.com/products/iminodisuccinate/imino.pdf.

"Polyaspartic Acid Sodium Salt: A New Biodegradable Dispersant," Product Brochure, Bayer Corporation [cited Aug. 13, 2002]: Available from: http://www.pasp-ids.com/products/polyaspartic/brochure/html.

"Alkoxylates, carbonates," Product Brochure, Huntsman Performance Chemicals [cited Sep. 5, 2002]: Available from: http://www.huntsman.com/performance_chemicals/ShowPage.cfm?PageID=1596.

"Biopolymers," Product Brochure, Donlar Biosyntrex Corporation [cited Sep. 5, 2002]: Available from: http://www.donlar.com/bp-products.cfm.

I. R. Collins, et al., "The Development of a Novel Environmentally Friendly Dual Function Corrosion and Scale Inhibitor," 2001 SPE International Symposium on Oilfield Chemistry, Houston, TX, Feb. 13-16 2002, SPE 65005.

W. W. Frenier, "Novel Scale Removers Are Developed for Dissolving Alkaline Earth Deposits," 2001 SPE International Symposium on Oilfield Chemistry, Houston, TX, Feb. 13-16 2002, SPE 65027.

PCT International Search Report for International Application No. PCT/US02/29318, Feb. 5, 2003.

* cited by examiner

Sodium Gluconate Crosslink Delay at 75 F (25 C)

— No Delay Agent ---- 2.0 pptg Sodium Gluconate  --- 4.0 pptg Sodium Gluconate

BIODEGRADABLE CHELANT COMPOSITIONS FOR FRACTURING FLUID

CROSS-REFERENCE TO RELATED APPLICATION

This application claims the benefit of U.S. provisional application Ser. No. 60/323,572 filed Sep. 19, 2001.

FIELD OF THE INVENTION

The present invention relates to fluids used in fracturing subterranean formations during hydrocarbon recovery operations, and more particularly relates, in one embodiment, to biodegradable fracturing fluids that can perform multiple functions in a fracturing operation.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity.

One difficulty with conventional fracturing fluids is the fact that they tend to emulsify when they come into contact with crude oil. Emulsions with crude oil can impair to totally restrict reservoir production. In order to prevent potential fracturing fluid-crude oil emulsions a demulsifier additive is used. Demulsifiers are typically used from 0.1 to 0.5% by volume within the fracturing fluid. Examples of demulsifier chemicals commonly used include alkyl sulfates, alkyl sulphonates, alkyl aromatic sulphonates, ethoxylated alkyl sulphonates, alkyl phosphonates, alkyl quaternary amines, alkyl amine oxides, oxyalkylated polyalkylene poly-amines, fatty acid polyalkyl aromatic ammonium chloride, polyalkylene glycols, polyalkylene glycol ethers, alkyl acrylates, alkyl amino alkyl acrylates, polyacrylates, alkyl acrylamides, alkyl amino alkyl acrylamides, polyacrylamides, alkyl phenols, ethoxylated alkyl phenol, polyoxyalkylated alkyl phenol resin, polyalkyl resins, alkyl phenol resins, alkyl phenol-aldehyde resins, alkoxylated alkyl phenol-aldehyde resins, polyoxylated alkyl phenol-aldehyde condensates, oligoamine alkoxylates, alkoxylated carboxylic acid esters, ethoxylated alcohols, organic and inorganic aluminum salts, copolymers of acrylates-surfactants, copolymers of acrylates-resins, copolymers of acrylates-alkyl aromatic amines, copolymers of carboxylics-polyols, co- or terpolymers of alkoxylated acrylates or methacrylates with vinyl compounds, condensates of mono- or oligoamine alkoxylates, dicarboxylic acids and alkylene oxide block copolymers, or blends of various demulsifier substances. Further, certain chemicals are known to enhance the performance of demulsifiers. Various demulsifier enhancers include, but are not necessarily limited to the following: alcohols, aromatics, alkanolamines, carboxylic acids, amino carboxylic acids, bisulfites, hydroxides, sulfates, phosphates, polyols, and mixtures thereof.

Fracturing fluids also include additives to help inhibit the formation of scale including, but not necessarily limited to, carbonate scales and sulfate scales. Such scale cause blockages not only in the equipment used in hydrocarbon recovery, but also can create fines that block the pores of the subterranean formation. Examples of scale inhibitors and/or scale removers incorporated into fracturing fluids include, but are not necessarily limited to polyaspartates; hydroxyaminocarboxylic acid (HACA) chelating agents, such as hydroxyethyliminodiacetic acid (HEIDA); ethylenediaminetetracetic acid (EDTA), diethylenetriaminepentaacetic acid (DTPA), nitrilotriacetic acid (NTA) and other carboxylic acids and their salt forms, phosphonates, acrylates, and acrylamides, and mixtures thereof.

Fracturing fluids that are crosslinked with titanate, zirconate, and/or borate ions (using compounds which generate these ions), sometimes contain additives that are designed to delay crosslinking. Crosslinking delay agents permit the fracturing to be pumped down hole to the subterranean formation before crosslinking begins to occur, thereby permitting more versatility or flexibility in the fracturing fluid. Examples of crosslink delay agents commonly incorporated into fracturing fluids include, but are not necessarily limited to organic polyols, such as sodium gluconate; sodium glucoheptonate, sorbitol, glyoxal, mannitol, phosphonates, aminocarboxylic acids and their salts (EDTA, DTPA, etc.) and mixtures thereof.

Other common additives employed in conventional fracturing fluids include crosslinked gel stabilizers that stabilize the crosslinked get (typically a polysaccharide crosslinked with titanate, zirconate or borate) for a sufficient period of time so that the pump rate and hydraulic pressure may fracture the subterranean formations. Suitable crosslinked gel stabilizers previously used include, but are not necessarily limited to, sodium thiosulfate, diethanolamine, triethanolamine, methanol, hydroxyethylglycine, tetraethylenepentamine, ethylenediamine and mixtures thereof.

Additional common additives for fracturing fluids are enzyme breaker (protein) stabilizers. These compounds stabilize the enzymes and/or proteins used in the fracturing fluids to eventually break the gel after the subterranean formation is fractured so that they are still effective at the time it is desired to break the gel. If the enzymes degrade too early they will not be available to effectively break the gel at the appropriate time. Examples of enzyme breaker stabilizers commonly incorporated into fracturing fluids include polyols (such as sorbitol, mannitol, and glycerol), sugars (such as lactose, fructose, and sucrose), inorganic salts (such as sodium chloride, potassium chloride, and calcium chloride), borax, boric acid, sulfites, erythorbates, polycarboxylic acids and their salts (such as oxalic acid, maleic acid, succinic acid, tartaric acid, aspartic acid, and citric acid), amino acids (such as arginine, lysine, glycine, and glutamine), aminocarboxylic acids and their salts (such as EDTA, DTPA, NTA), phosphates, phosphonates, sulfates, sulphonates, acrylates, acrylamides, and mixtures thereof.

Further, many of the common additives previously used discussed above present environmental concerns because they are not readily biodegradable when it becomes necessary to dispose of the fracturing fluid.

It would be desirable if multifunctional fracturing fluid compositions could be devised that have suitable properties or characteristics as discussed above using biodegradable additives and compounds.

SUMMARY OF THE INVENTION

Accordingly, it is an object of the present invention to provide a multi-functional additive composition for fracturing fluids that is biodegradable.

It is another object of the present invention to provide a biodegradable fracturing fluid additive composition that can improve at least two properties of the fracturing fluid within which it is incorporated.

In carrying out these and other objects of the invention, there is provided, in one form, a biodegradable fracturing fluid composition comprising: a) water; and b) at least two of the compounds from the following group: sodium polyaspartate; sodium iminodisuccinate; disodium hydroxyethyleneiminodiacetate (Na$_2$HEIDA); sodium gluconate; sodium glucoheptonate; sugar alcohols; mono-saccharides; disaccharides; and mixtures thereof. Suitable optional solvents and surfactants may be selected from the group consisting of polyvinylpyrrolidone (PVP), octyl pyrrolidone, methyl pyrrolidone, alkyl glycols, alkyl glycol ethers, alkyl glucosides, alkyl glutamates, alkyl sarcosinates, alkyl carbonates, mono ethanol amide, alkyl succinates, alkyl sorbitans, and mixtures thereof.

DETAILED DESCRIPTION OF THE INVENTION

Figure 1:
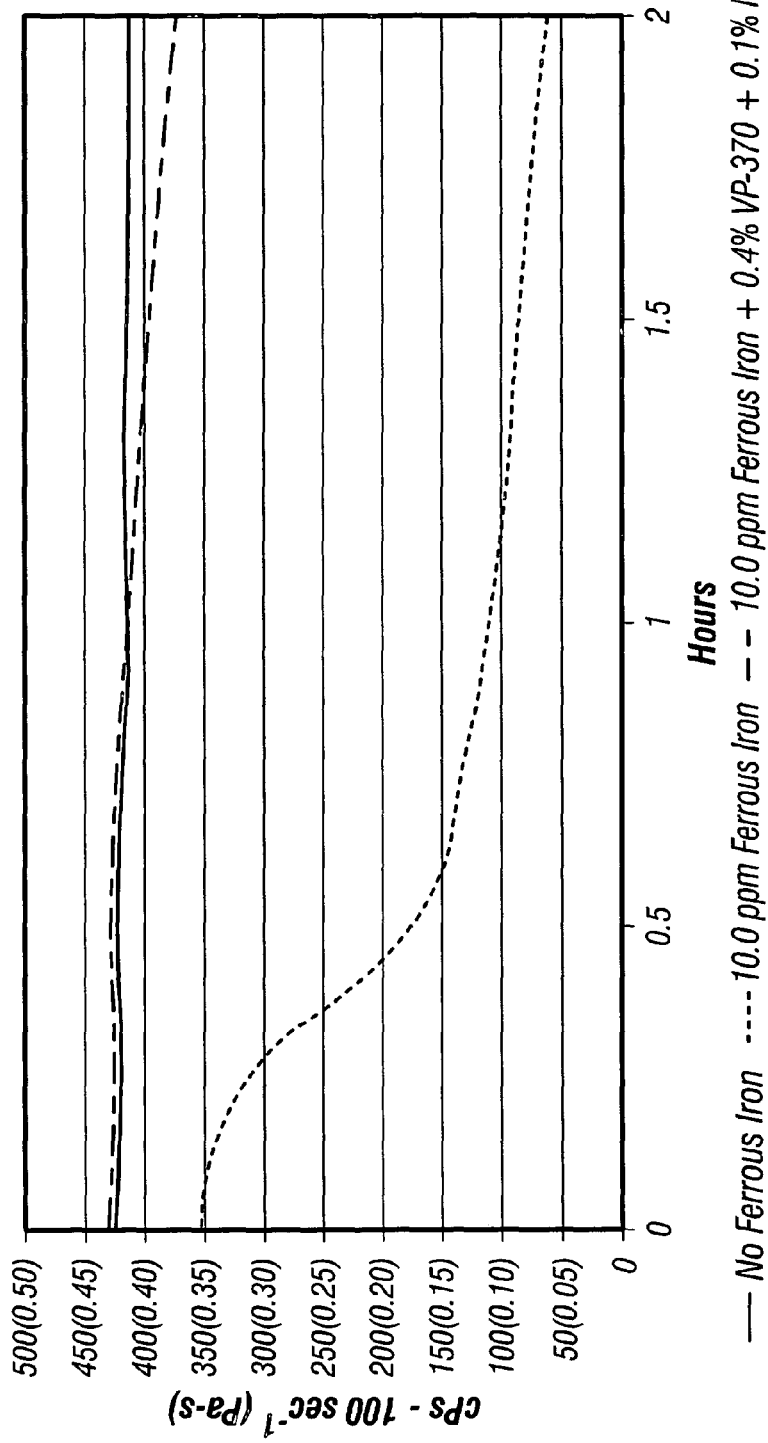
FIG. 1 is a graph of a crosslink stability test of BoraFRAQ at 175° F. (79° C.) showing the ability of various materials to chelate ferrous iron.

A readily biodegradable and environmentally non-toxic chelant composition has been discovered. The chelant composition has multi-functional properties for use in fracturing fluids. As noted, fracturing fluids are typically light brines containing crosslinked polysaccharide polymers. The chelant compositions of this invention may be comprised of agents including water, sodium polyaspartate, sodium iminodisuccinate, disodium hydroxyethyleneiminodiacetic, polyvinylpyrrolidone, sodium gluconate, sodium glucoheptonate and mixtures of these, and the like without being limited to these particular chelants.

The multi-functional properties include, but are not necessarily limited to:

a. helping prevent, inhibit or reduce the fracturing fluid from creating an emulsion when it is commingled with crude oil, either directly or as a demulsifier enhancer;

b. use as a gel stabilizer to help prevent, inhibit or reduce crosslinked gel degradation due to divalent or trivalent ion contamination;

c. helping prevent, inhibit or reduce carbonate and sulfate scales from forming within the oil or gas well;

d. use as a crosslink delay agent for fracturing fluids that use a titanate, zirconate or borate crosslinker; and e. use as an enzyme breaker (protein) stabilizer to aid salinity and metallic ion tolerance.

Many oil companies are requesting "green" fracturing fluid chemistry, that is, environmentally friendly. Presently used demulsifiers (or non-emulsifiers) and scale inhibitors which use a completely different chemistry from that herein, tend to have environmental concerns and do not have the unexpected and multi-functional character the chelant composition of the invention has. The inventive composition is a multi-functional product that is very benign to the environment and is readily biodegradable. The compositions of this invention are synergistic in that it is unexpected and surprising that they serve multiple functions while being biodegradable as well.

The biodegradable chelant composition of the invention may have at least two of the following components, preferably at least three of the following components:

Sodium Polyaspartate—This compound is also known as polymerized aspartic amino acid; it chelates with multiple types of divalent and trivalent ions; useful in breaking emulsions and scale prevention.

Sodium Iminodisuccinate—This compound is a maleic acid derivative. Its main use is as a chelant for divalent and trivalent ions. It complexes ions that can cause emulsions, form scale, can denature enzyme breakers, and cause crosslinked gel instability, and thus it can keep these ions from having these undesirable effects.

Disodium Hydroxyethyleneiminodiacetic (Na$_2$HEIDA)—This is one of the few amino carboxylic acid chelants that is readily biodegradable. It is useful for the chelation of divalent and trivalent ions that cause scale, can denature enzymes, and create crosslinked gel instability.

Sodium Gluconate and Sodium Glucoheptonate—These polyols are commonly used for chelation of mineral vitamins such as calcium, magnesium, iron, manganese, and copper. They have been also found to be useful herein to complex titanate, zirconate, and borate ions for crosslink delay purposes. They are also excellent iron complexors for enzyme breaker stability and crosslinked gel stability.

Alkyl Pyrrolidones (including, but not necessarily limited to, Polyvinyl Pyrrolidone, Octyl Pyrrolidone, Methyl Pyrrolidone), Alkyl Glycols, Alkyl Glycol Ethers, Alkyl Glucosides, Alkyl Glutamates, Alkyl Sarcosinates, Alkyl Succinates, Alkyl Carbonates, Monoethanol Amide, Alkyl Sorbitans—These and other biodegradable and non-toxic solvents and surfactants will enhance the multifunctional green chelants' properties in a fracturing fluid. The alkyl substituents on these solvents and surfactants may be straight, branched or cyclic alkyls of from 1 to 18 carbon atoms. Examples of suitable alkyl carbonates include, but are not necessarily limited to, ethylene carbonate, propylene carbonate, and butylene carbonate.

Sugar Alcohols, Monosaccharides and Disaccharides—Suitable saccharides include, but are not necessarily limited to glucoses, mannose, galactose, fructose, lactose, and the like, and suitable sugar alcohols include, but are not necessarily limited to sorbitol, xylitol, mannitol, and the like, and mixtures thereof. These hydroxyl-bearing compounds will help stabilize enzymes, help delay crosslink, and aid in demulsifier oil/brine phase breakout.

The biodegradable chelant compositions of the invention would be particularly expected to find utility as demulsifiers in production applications, e.g. to prevent emulsions of or demulsify emulsions of produced fluids, generally oil-in-water and water-in-oil emulsions, with or without the presence of a gas phase. In the context of this invention, the term "demulsifier" includes the role of demulsifier enhancer, that is, a substance that facilitates, increases, augments, amplifies and otherwise improves the performance of a separate, different demulsifier compound.

Generally, the chelants of the composition of this invention function by complexing with or binding up certain metal or non-metal ions that adversely affect the fracturing fluid. For instance, when the chelants capture trace metal ions in crude oil, the polarity of the crude is reduced making it less prone to emulsify. By binding up metal ions that would otherwise attack proteins, the chelant help keep enzymes intact until they are ready to serve the gel breaking function. The chelants are expected to work relatively quickly and conventional mixing techniques are expected to aid and help accomplish the methods of the invention.

number of complex, interrelated factors including, but not necessarily limited to the nature of the fracturing fluid, the temperature of the fracturing fluid at the time fracturing is expected to occur, the particular chelants employed, the particular solvents employed, and the like. However, in the interest of giving some indication of expected proportions, in one non-limiting embodiment, the individual chelant proportions in the chelant composition may range from about 0.1 to about 90.0%, preferably from about 0.5 to about 40.0%. In turn, the proportion of the overall chelant composition (the total of the chelants, solvents, surfactants, etc.) in the fracturing fluid may range from about 0.05 to about 10.0% preferably from about 0.1 to about 2.0%.

The present invention will be explained in further detail in the following non-limiting Examples that are only designed to additionally illustrate the invention but not narrow the scope thereof.

Table 1 gives compatibility test data for various chelants with a particular crude oil. This is a test of the various chelants as a demulsifier. EC9547A and EC9546A are known demulsifiers that are blends of polyglycols in alcohol available from Nalco/Exxon Chemicals. The crude oil was the same for all Examples in Table 1, and the temperature for all was 72° F. (22° C.). The chelants are defined as follows:

| | |
|---|---|
| A-5D | A sodium polyaspartate product available from Donlar Corporation. |
| A-3C | A sodium polyaspartate product available from Donlar Corporation. |
| N-300 | A sodium polyaspartate product available from Bayer. |
| $Na_3$HEIDA | Reagent grade hydroxyethyleneiminodiacidic acid neutralized with NaOH to 11.8 pH available from Aldrich. |
| Na Gluconate | Reagent grade sodium gluconate available from Aldrich. |
| VP-370 | Iminodisuccinate product available from Bayer. |
| Product A | A laboratory blend of the following chelants: 30.0% sodium gluconate, 18.0% A-5D, and 2.0% Bayer VP-370, with the 70.0% balance being water. |

TABLE 1

Compatibility Tests Data

| | Broken | | | | Percent Frac Fluid Phase Breakout After | | | |
|---|---|---|---|---|---|---|---|---|
| Ex. | Frac Fluid, % | Crude % | Chelant | Demulsifier | 1 min | 2 min. | 5 min. | 10 min. |
| 1 | 50.0 | 50.0 | none | none | 10 | 44 | 88 | 92 |
| 2 | 49.5 | 49.5 | 1.0% A-5D | none | 80 | 96 | 98 | 99 |
| 3 | 49.5 | 49.5 | 1.0% A-3C | none | 76 | 92 | 98 | 99 |
| 4 | 49.5 | 49.5 | 1.0% N-300 | none | 68 | 92 | 98 | 99 |
| 5 | 49.75 | 49.75 | 0.5% $Na_3$HEIDA | none | 76 | 88 | 98 | 99 |
| 6 | 49.8 | 49.8 | 0.4% Na Gluconate | none | 44 | 84 | 99 | 99 |
| 7 | 49.5 | 49.5 | 1.0% VF-370 | none | 0 | 8 | 20 | 64 |
| 8 | 49.5 | 49.5 | none | 1.0% EC9547A | 56 | 88 | 98 | 100 |
| 9 | 49.5 | 49.5 | none | 1.0% EC9546A | 36 | 80 | 98 | 100 |
| 10 | 49.75 | 49.75 | 0.5% Product A | none | 84 | 100 | 100 | 100 |

It is generally difficult to specify the preferred proportions of the chelants in the compositions, and in turn, in the fracturing fluids since such proportions will depend upon a FIG. 1 is a graph of a crosslinked gel stability test. The gel is produced by BoraFRAQ 30, a gelling agent available from Baker Oil Tools. The first, solid curve shows a stable gel at about 425–405 cPs (0.425–0.405 Pa-s) over the course of 2 hours. The second, dashed curve shows the adverse effect of 10.0 ppm ferrous iron ion destabilizing the gel, particularly after about 0.4 hr. The third curve demonstrates that 0.4% VP-370 with 0.1% Na$_3$HEIDA stabilizes the gel even in the presence of 10.0 ppm ferrous iron ion and gives a result almost as good as the curve when no iron ion was present. Clearly, these two chelants complexed with the iron ion.

Figure 2:
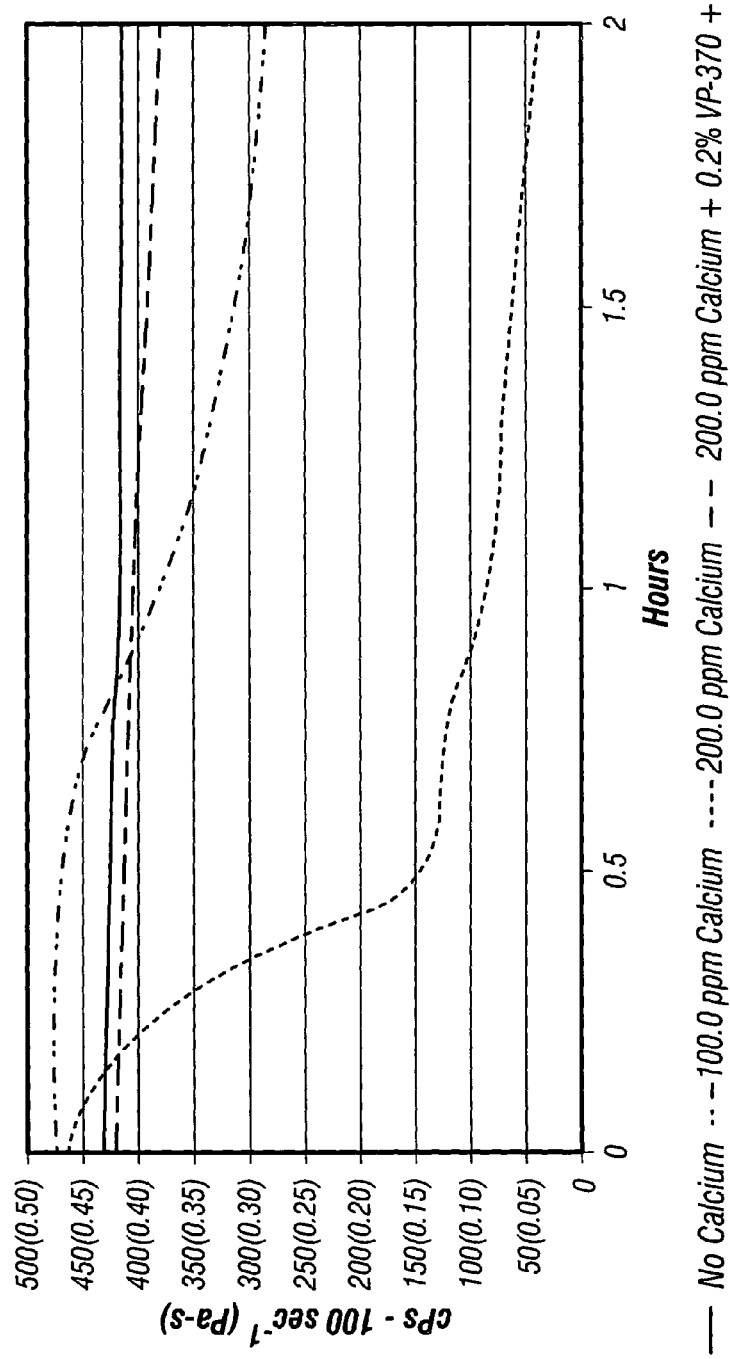
FIG. 2 is a graph of the crosslink stability test of BoraFRAQ at 175° F. (79° C.) showing the ability of various materials to chelate calcium.

Similarly, FIG. 2 is another graph of a crosslinked gel stability test similar to FIG. 1 except that calcium ion was used instead of iron. Again, it may be seen that VP-370 and A-5D chelants complexed with even 200.0 ppm calcium to help stabilize the gel.

Figure 3:
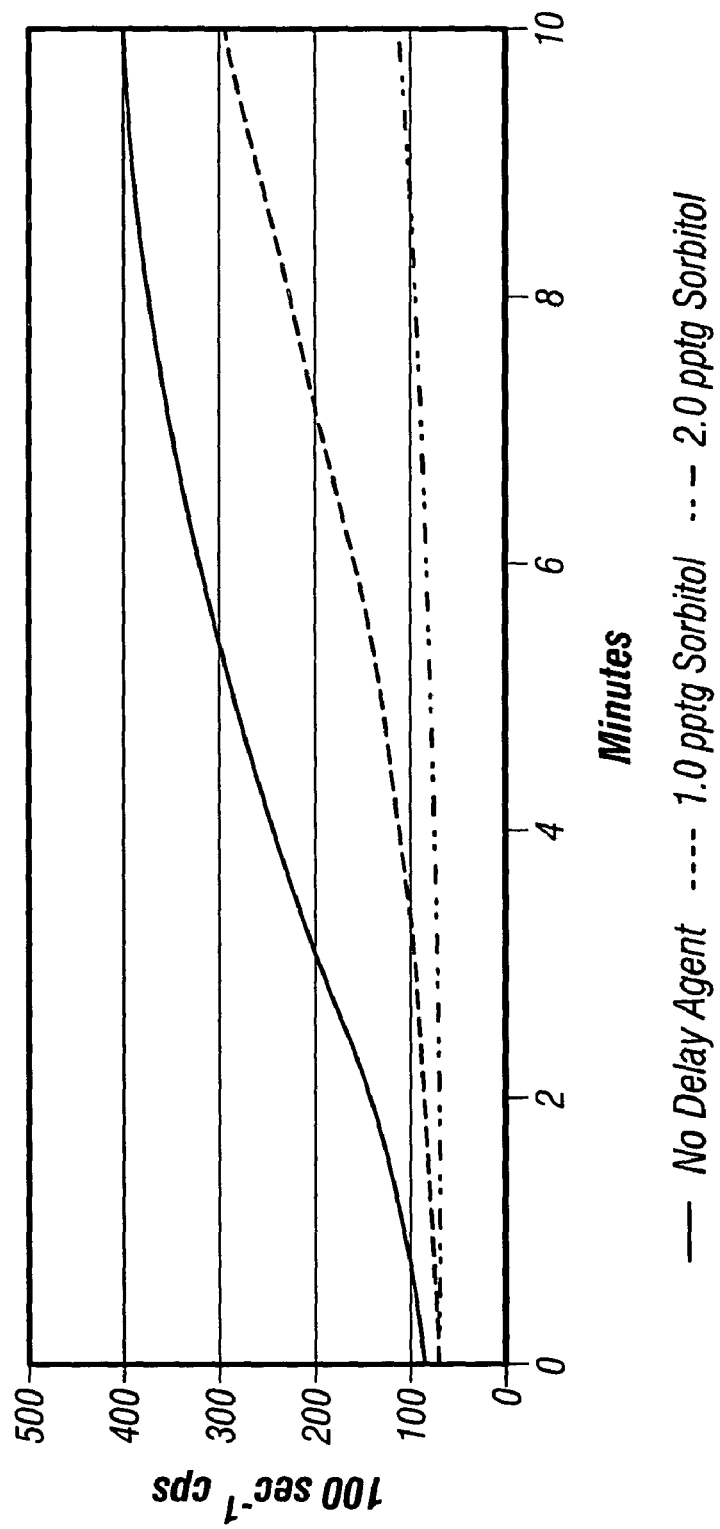
FIG. 3 is a graph of the use of sorbitol as a crosslink delay agent for Emerald FRAQ 30D at 75° F. (24° C.)
Figure 4:
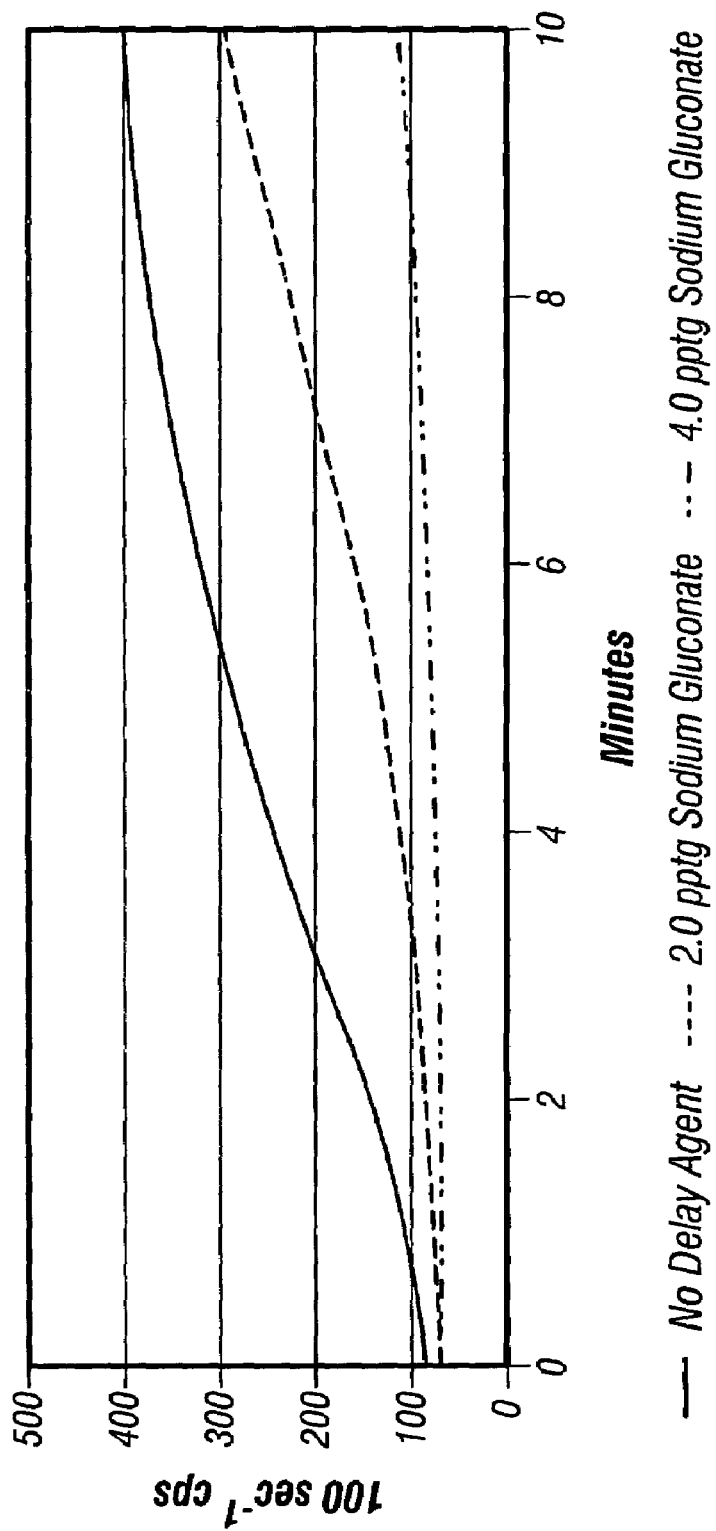
FIG. 4 is a graph of the use of sodium gluconate as a crosslink delay agent for Emerald FRAQ 30D at 75° F. (24° C.).

FIGS. 3 and 4 show that the crosslink delay rate can be modified by using various amounts of the sorbitol and sodium gluconate chelants of this invention. The data were obtained from a Brookfield viscometer, showing the viscosity increase over the first 10 minutes once the crosslinker is added. The system used was Emerald FRAQ 30D, which includes 30 pptg (3.4 kg/m$^3$) guar loading with 0.8 gptg (lptI) XL-2LWE and 2.0 gptg (lptI) BA-5. XL-2LWE is a delayed borate crosslinker, and BA-5 is a pH buffer. These Figures demonstrate the use of the chelants of this invention as effective crosslink delay agents.

In the foregoing specification, the invention has been described with reference to specific embodiments thereof, and has been demonstrated as effective in stabilizing gels and inhibiting emulsions through chelation. These mechanisms and others would be expected to work in commercial fracturing fluids. However, it will be evident that various modifications and changes can be made to the chelant compositions and fracturing fluids without departing from the broader spirit or scope of the invention as set forth in the appended claims. Accordingly, the specification is to be regarded in an illustrative rather than a restrictive sense. For example, specific combinations of chelants falling within the claimed parameters, but not specifically identified or tried in particular compositions, are anticipated and expected to be within the scope of this invention.

I claim:

1. A biodegradable additive composition comprising:
   a) water;
   b) at least two of the chelants selected from the group consisting of:
      sodium polyaspartate;
      sodium iminodisuccinate;
      disodium hydroxyethyleneiminodiacetate (Na$_2$HEIDA);
      sodium gluconate;
      sodium glucoheptonate;
      sugar alcohols;
      monosaccharides; and
      disaccharides,
      where at least one of the two chelants is selected from the group consisting of sodium polyaspartate, sodium iminodisuccinate, Na$_2$HEIDA, and mixtures thereof: and
   c) a solvent or surfactant selected from the group consisting of polyvinylpyrrolidone (PVP), alkyl pyrrolidones, alkyl succinates, alkyl glutamates, alkyl carbonates, monoethanol amide, and alkyl glucosides.

2. The biodegradable additive composition of claim 1, where the amount of the compounds of b) is effective to improve at least one characteristic of a biodegradable fracturing fluid composition to which the biodegradable additive composition is added, which characteristic is selected from the group consisting of:
   demulsification;
   crosslink gel stabilization
   carbonate or sulfate scale inhibitor;
   crosslink delay;
   enzyme breaker stabilization; and mixtures thereof.

3. The biodegradable additive composition of claim 2 where at least two characteristics are improved.

4. The biodegradable additive composition of claim 1 where in b) at least one of the chelants is selected from the group consisting of sorbitol, mannitol, and xylitol, and saccharides selected from the group consisting of glucoses, fructose, mannose, galactose, lactose, and mixtures thereof.

5. A biodegradable additive composition comprising:
   a) water; and
   b) at least one chelant selected from the group consisting of sodium iminodisuccinate, disodium hydroxyethyleneiminodiacetate (Na$_2$HEIDA), and mixtures thereof;
   c) at least one additional chelant selected from the group consisting of:
      sodium polyaspartate;
      sodium gluconate;
      sodium glucoheptonate;
      sugar alcohols;
      monosaccharides;
      disaccharides; and
   d) a solvent or surfactant selected from the group consisting of polyvinylpyrrolidone (PVP), alkyl pyrrolidones, alkyl succinates, alkyl glutamates, alkyl alkyl carbonates, monoethanol amide, and alkyl glucosides.

6. The biodegradable additive composition of claim 5 where in at least three chelants are included.

7. The biodegradable additive composition of claim 5 where at least one of the chelants is selected from the group consisting of sorbitol, mannitol, and xylitol, and saccharides selected from the group consisting of glucoses, fructose, mannose, galactose, lactose, and mixtures thereof.

8. A method of fracturing a subterranean formation comprising:
   providing a biodegradable fracturing fluid composition having:
      a) a crosslinker selected from the group consisting of titanate, zirconate, and borate crosslinkers, compounds that can generate these crosslinkers and mixtures thereof;
      b) at least two of the chelants selected from the group consisting of:
         sodium polyaspartate;
         sodium iminodisuccinate;
         disodium hydroxyethyleneiminodiacetate (Na$_2$HEIDA);
         sodium gluconate;
         sodium glucoheptonate;
         sugar alcohols;
         monosaccharides; and
         disaccharides;
         where the amount of the compounds of b) is effective to demulsify the fracturing fluid and where at least one of the two chelants is selected from the group consisting of sodium polyaspartate, sodium iminodisuccinate, Na$_2$HEIDA, and mixtures thereof; and
      c) water; and
   pumping the fracturing fluid down hole at a pressure effective to fracture a subterranean formation.

9. The method of claim 8, where the amount of the compounds of b) is additionally effective to improve at least one second characteristic of the biodegradable fracturing fluid composition, which second characteristic is selected from the group consisting of:
 carbonate or sulfate scale inhibition;
 crosslink gel stabilization
 crosslink delay; and
 enzyme breaker stabilization.

10. The method of claim 8 where in b) at least three of the chelants of the group are included.

11. The method of claim 8, where the fracturing fluid further comprises a solvent or surfactant selected from the group consisting of polyvinylpyrrolidone (PVP); alkyl glycols, alkyl glycol ethers, alkyl pyrrolidones, alkyl succinates, alkyl glutamates, alkyl sarcosinates, alkyl carbonates, monoethanol amide, alkyl sorbitans, and alkyl glucosides.

12. The method of claim 8 where in b) at least one of the chelants is selected from the group consisting of sorbitol, mannitol, and xylitol, and saccharides selected from the group consisting of glucoses, fructose, mannose, galactose, lactose, and mixtures thereof.

13. A method of fracturing a subterranean formation comprising:
 providing a biodegradable fracturing fluid composition having:
  a) a crosslinker selected from the group consisting of titanate, zirconate, and borate crosslinkers, compounds that can generate these crosslinkers and mixtures thereof;
  b) at least two of the chelants selected from the group consisting of:
   sodium polyaspartate;
   sodium iminodisuccinate;
   disodium hydroxyethyleneiminodiacetate (Na$_2$HEIDA);
   sodium gluconate;
   sodium glucoheptonate;
   sugar alcohols;
   monosaccharides; and
   disaccharides;
   where the amount of the compounds of b) is effective to delay crosslinking of the crosslinkers and where at least one of the two chelants is selected from the group consisting of sodium polyaspartate, sodium iminodisuccinate, Na$_2$HEIDA, and mixtures thereof; and
  c) water; and
 pumping the fracturing fluid down hole at a pressure effective to fracture a subterranean formation.

14. The method of claim 13, where the amount of the compounds of b) is additionally effective to improve at least one second characteristic of the biodegradable fracturing fluid composition, which second characteristic is selected from the group consisting of:
 demulsification;
 crosslink gel stabilization
 carbonate or sulfate scale inhibition; and
 enzyme breaker stabilization.

15. A method of fracturing a subterranean formation comprising:
 providing a biodegradable fracturing fluid composition having:
  a) a crosslinker selected from the group consisting of titanate, zirconate, and borate crosslinkers, compounds that can generate these crosslinkers and mixtures thereof;
  b) at least two of the chelants selected from the group consisting of:
   sodium polyaspartate;
   sodium iminodisuccinate;
   disodium hydroxyethyleneiminodiacetate (Na$_2$HEIDA);
   sodium gluconate;
   sodium glucoheptonate;
   sugar alcohols;
   monosaccharides; and
   disaccharides;
   where the amount of the compounds of b) is effective to improve carbonate or sulfate scale inhibition, as compared with identical fracturing fluids without the compounds of b) and where at least one of the two chelants is selected from the group consisting of sodium polyaspartate, sodium iminodisuccinate, Na$_2$HEIDA, and mixtures thereot and
  c) water; and
 pumping the fracturing fluid down hole at a pressure effective to fracture a subterranean formation.

16. The method of claim 15, where the amount of the compounds of b) is additionally effective to improve at least one second characteristic of the biodegradable fracturing fluid composition, which second characteristic is selected from the group consisting of:
 demulsification;
 crosslink gel stabilization
 crosslink delay; and
 enzyme breaker stabilization.

17. A method of fracturing a subterranean formation comprising:
 providing a biodegradable fracturing fluid composition having:
  a) a crosslinker selected from the group consisting of titanate, zirconate, and borate crosslinkers, compounds that can generate these crosslinkers and mixtures thereof;
  b) at least two of the chelants selected from the group consisting of:
   sodium polyaspartate;
   sodium iminodisuccinate;
   disodium hydroxyethyleneiminodiacetate (Na$_2$HEIDA);
   sodium gluconate;
   sodium glucoheptonate;
   sugar alcohols;
   monosaccharides; and
   disaccharides;
   where the amount of the compounds of b) is effective to improve crosslink gel stabilization of b) as compared with identical fracturing fluids without the compounds of b) and where at least one of the two chelants is selected from the group consisting of sodium polyaspartate, sodium iminodisuccinate, Na$_2$HEIDA, and mixtures thereof; and
  c) water; and
 pumping the fracturing fluid down hole at a pressure effective to fracture a subterranean formation.

18. The method of claim 17, where the amount of the compounds of b) is additionally effective to improve at least one second characteristic of the biodegradable fracturing fluid composition, which second characteristic is selected from the group consisting of:
 demulsification;
 carbonate or sulfate scale inhibition
 crosslink delay; and
 enzyme breaker stabilization.

19. A method of fracturing a subterranean formation comprising:
  providing a biodegradable fracturing fluid composition having:
    a) a crosslinker selected from the group consisting of titanate, zirconate, and borate crosslinkers, compounds that can generate these crosslinkers and mixtures thereof;
    b) at least two of the chelants selected from the group consisting of:
      sodium polyaspartate;
      sodium iminodisuccinate;
      disodium hydroxyethyleneiminodiacetate ($Na_2HEIDA$);
      sodium gluconate;
      sodium glucoheptonate;
      disaccharides
      where the amount of the compounds of b) is effective to improve enzyme breaker stabilization of b) as compared with identical fracturing fluids without the compounds of b) and where at least one of the two chelants is selected from the group consisting of sodium polyaspartate, sodium iminodisuccinate, $Na_2HEIDA$, and mixtures thereof; and
    c) water; and
  pumping the fracturing fluid down hole at a pressure effective to fracture a subterranean formation.

20. The method of claim 19, where the amount of the compounds of b) is additionally effective to improve at least one second characteristic of the biodegradable fracturing fluid composition, which second characteristic is selected from the group consisting of:
  demulsification;
  crosslink gel stabilization
  carbonate or sulfate scale inhibition; and
  crosslink delay.

21. A fracturing fluid comprising:
  a) water;
  b) at least two of the chelants selected from the group consisting of:
    sodium polyaspartate;
    sodium iminodisuccinate;
    disodium hydroxyethyleneiminodiacetate ($Na_2HEIDA$);
    sodium gluconate;
    sodium glucoheptonate;
    sugar alcohols;
    monosaccharides; and
    disaccharides;
    where at least one of the two chelants is selected from the group consisting of sodium polyaspartate, sodium iminodisuccinate, $Na_2HEIDA$, and mixtures thereof.
  c) a polymer; and
  d) a polymer crosslinker selected from the group consisting of titanate, zirconate, and borate crosslinkers, compounds that can generate these crosslinkers and mixtures thereof.

22. The fracturing fluid of claim 21 where in b) at least one of the chelants is selected from the group consisting of sorbitol, mannitol, and xylitol, and saccharides selected from the group consisting of glucoses, fructose, mannose, galactose, lactose, and mixtures thereof.

* * * * *